(12) United States Patent
Baasch et al.

(10) Patent No.: US 9,604,602 B2
(45) Date of Patent: Mar. 28, 2017

(54) WIPER MOTOR DRIVE SYSTEM HAVING BREAKAWAY CLUTCH

(71) Applicant: TRICO PRODUCTS CORPORATION, Rochester Hills, MI (US)

(72) Inventors: Oswald Baasch, Bowling Green, KY (US); Danny W. Brown, Bowling Green, KY (US); Casey A. Thomas, Russellville, KY (US); Jon A. Bigley, Bowling Green, KY (US)

(73) Assignee: Trico Products Corporation, Rochester Hills, MI (US)

( * ) Notice: Subject to any disclaimer, the term of this patent is extended or adjusted under 35 U.S.C. 154(b) by 404 days.

(21) Appl. No.: 14/174,124

(22) Filed: Feb. 6, 2014

(65) Prior Publication Data

US 2014/0215745 A1 Aug. 7, 2014

Related U.S. Application Data

(60) Provisional application No. 61/762,118, filed on Feb. 7, 2013.

(51) Int. Cl.
*B60S 1/26* (2006.01)
*B60S 1/58* (2006.01)
(Continued)

(52) U.S. Cl.
CPC .............. *B60S 1/583* (2013.01); *B60S 1/342* (2013.01); *B60S 1/06* (2013.01)

(58) Field of Classification Search
CPC ............ B60S 1/06; B60S 1/583; B60S 1/342
(Continued)

(56) References Cited

U.S. PATENT DOCUMENTS 2,071,851 A * 2/1937 Mustin ...................... B60S 1/06
15/250.12
2,229,641 A * 1/1941 Darling ..................... B60S 1/06
123/198 C
(Continued)

FOREIGN PATENT DOCUMENTS

CA 2282021 A1 * 10/1998 ................ B60S 1/08
EP 1 498 627 A1 1/2005
(Continued)

OTHER PUBLICATIONS

Nov. 24, 2014 International Search Report and Written Opinion for PCT/US2014/015363.

*Primary Examiner* — Michael Jennings
(74) *Attorney, Agent, or Firm* — Miller Canfield (57) ABSTRACT

The present invention relates to a wiper motor drive system that includes a motor, an output shaft operatively connected to a wiper blade, and a breakaway clutch operatively connected between the motor and output shaft. The breakaway clutch includes a torque-sensitive releasable locking mechanism having a first position wherein torque is translated from the motor to the output shaft through the breakaway clutch to drive the wiper blade across a surface to be wiped, and a second position wherein torque is interrupted between the motor and the output shaft in response to a predetermined rotational torque differential acting on the output shaft, with the locking mechanism being movable back to the first position when the differential torque is reduced on the output shaft.

16 Claims, 7 Drawing Sheets

(51) Int. Cl.
*B60S 1/34* (2006.01)
*B60S 1/06* (2006.01)

(58) Field of Classification Search
USPC .................................................. 15/250.31
See application file for complete search history.

(56) References Cited

U.S. PATENT DOCUMENTS

| | | | |
|---|---|---|---|
| 2,241,004 A * | 5/1941 | Sibley | B60S 1/06 91/226 |
| 2,523,992 A * | 9/1950 | Hess | B60S 1/06 15/250.13 |
| 3,026,555 A | 3/1962 | Dudley | |
| 3,454,144 A | 7/1969 | Haller | |
| 3,712,433 A | 1/1973 | Thut | |
| 3,942,337 A | 3/1976 | Leonard et al. | |
| 3,991,590 A * | 11/1976 | Brems | G05G 15/08 192/56.1 |
| 4,271,944 A | 6/1981 | Hanson | |
| 4,610,340 A | 9/1986 | Helmes et al. | |
| 4,770,055 A * | 9/1988 | Chevance | E05F 11/505 464/160 |
| 4,774,423 A | 9/1988 | Karasawa et al. | |
| 4,901,610 A | 2/1990 | Larson et al. | |
| 4,944,375 A | 7/1990 | Ohta et al. | |
| 5,274,876 A | 1/1994 | Wehrspann | |
| 5,529,159 A | 6/1996 | Troccaz | |
| 5,570,923 A | 11/1996 | Taylor | |
| 5,672,110 A | 9/1997 | Kurita et al. | |
| 5,868,229 A | 2/1999 | Hinterlechner | |
| 5,979,256 A * | 11/1999 | Kilker | B60S 1/166 15/250.3 |
| 6,003,193 A | 12/1999 | Rivin et al. | |
| 6,026,536 A | 2/2000 | Miller et al. | |
| 6,449,798 B1 * | 9/2002 | Rivin | B60S 1/166 15/250.3 |
| 6,609,266 B1 | 8/2003 | Satoh et al. | |
| 6,978,510 B2 | 12/2005 | Knauf | |
| 7,134,509 B2 | 11/2006 | Rahm | |
| 7,399,245 B2 | 7/2008 | Spintzyk | |
| 7,530,439 B2 | 5/2009 | Yamada et al. | |
| 7,568,257 B2 | 8/2009 | Yagi et al. | |
| 7,657,962 B2 | 2/2010 | Bendo | |
| 7,657,963 B2 | 2/2010 | Bendo | |
| 7,673,366 B2 | 3/2010 | Yagi et al. | |
| 7,685,670 B2 | 3/2010 | Yagi et al. | |
| 8,171,597 B2 | 5/2012 | Yagi | |
| 8,220,610 B2 | 7/2012 | Su | |
| 2006/0059646 A1 | 3/2006 | Bendo | |
| 2006/0223640 A1 | 10/2006 | Bassett et al. | |
| 2007/0261191 A1 * | 11/2007 | Yagi | B60S 1/166 15/250.001 |
| 2008/0121489 A1 * | 5/2008 | Chevalier | F16D 3/68 192/105 BB |

FOREIGN PATENT DOCUMENTS

| | | | |
|---|---|---|---|
| EP | 1 529 701 A2 | 11/2005 | |
| JP | 2009-281417 A | 12/2009 | |
| KR | 10-2005-0015566 A | 2/2005 | |
| WO | WO 9633893 A1 * | 10/1996 | B60N 2/0248 |

* cited by examiner

WIPER MOTOR DRIVE SYSTEM HAVING BREAKAWAY CLUTCH

REFERENCE TO RELATED APPLICATION

This application claims priority to and all benefits from the provisional application having U.S. Ser. No. 61/762,118 filed Feb. 7, 2013 and entitled CLUTCH MECHANISM.

BACKGROUND OF THE INVENTION

1. Field of Invention

The present invention relates generally to wiper systems, and more specifically, to a wiper motor drive system having a breakaway clutch.

2. Description of Related Art

Conventional automotive wiper systems known in the art typically include some type of wiper blade (sometimes referred to as a wiper assembly) mounted to a wiper arm which, in turn, is mounted adjacent to a surface to be wiped, such as the windshield or the rear window of a vehicle, and pivotally driven by a wiper motor drive system to impart reciprocal motion to the wiper blade across the window. Modern wiper motor drive systems known in the art typically include a motor, a transmission (sometimes referred to as a gear set or linkage), and an output shaft, wherein the transmission translates rotational movement from the motor to the output shaft, which drives the wiper arm and wiper blade.

Each of the components of a wiper motor drive system of the type described above must cooperate to effectively translate rotational movement from the motor to the output shaft, so as to ensure a consistent and effective wipe. Further, there is a desire to reduce the weight of automotive components, as lower total vehicle weight equates to improved fuel economy. Thus, wiper motor drive systems must be designed not only to facilitate consistent wipe quality, but also in such a way so as to reduce overall weight, geometry, and manufacturing cost. Consequently, there is a trend in the art of utilizing smaller, lighter wiper motor drive systems having smaller motors and transmissions. Typically, these systems include smaller, lighter components that are relatively weaker than components used in larger, conventional wiper motor drive systems.

Particularly with respect to rear window wiper motor drive systems, there is a concern of external forces acting on the wiper arm or wiper blade and damaging the components of the wiper motor drive system. By way of example, external torque or resistance may be applied to the wiper blade or arm due to: ice buildup, caught cleaning implements (such as in a drive-through car wash), grabbing or pulling of the wiper arm by a child, incorrect handling during wiper blade replacement, etc.

Thus, there remains a need in the art for a wiper motor drive system that has superior operational characteristics, reduced weight and dimensions, and that can withstand torque applied by external or environmental forces.

SUMMARY OF THE INVENTION

The present invention overcomes the disadvantages in the related art in a wiper motor drive system having breakaway clutch. The wiper motor drive system includes a motor, an output shaft operatively connected to a wiper blade, and a breakaway clutch operatively connected between the motor and output shaft. The breakaway clutch includes a torque-sensitive releasable locking mechanism that has a first position wherein torque is translated from the motor to the output shaft through the breakaway clutch to drive the wiper blade across a surface to be wiped. The torque-sensitive releasable locking mechanism also has a second position wherein torque is interrupted between the motor and the output shaft in response to a predetermined rotational torque differential acting on the output shaft, the locking mechanism being movable back to the first position when the differential torque is reduced on the output shaft.

In addition, the present invention is a wiper motor drive system that includes a motor, a transmission operatively connected to the motor, an output shaft operatively connected to a wiper blade, and a breakaway clutch operatively connected between the transmission and output shaft. The breakaway clutch includes a torque-sensitive releasable locking mechanism that has a first position wherein torque is translated from the transmission to the output shaft through the breakaway clutch to drive the wiper blade across a surface to be wiped. The torque-sensitive releasable locking mechanism also has a second position wherein torque is interrupted between the transmission and the output shaft in response to a predetermined rotational torque differential acting on the output shaft, the locking mechanism being movable back to the first position when the differential torque is reduced on the output shaft.

In this way, the wiper motor drive system of the present invention detachably links the output shaft to the motor and/or transmission through a breakaway clutch, providing torque-sensitive overload protection to the wiper motor drive system. This enables the components of the wiper motor drive system (for example, transmission gears, linkages, and motors) to be designed with greater flexibility in terms of size and geometry, weight, material selection, and stress/force capability. Specifically, those having ordinary skill in the art will appreciate that smaller, lighter, and less expensive components can be utilized in wiper motor drive systems in light of the torque-sensitive overload protection afforded by the present invention.

Other objects, features, and advantages of the present invention will be readily appreciated as the same becomes better understood after reading the subsequent description taken in connection with the accompanying drawings.

DETAILED DESCRIPTION OF THE INVENTION

Figure 1:
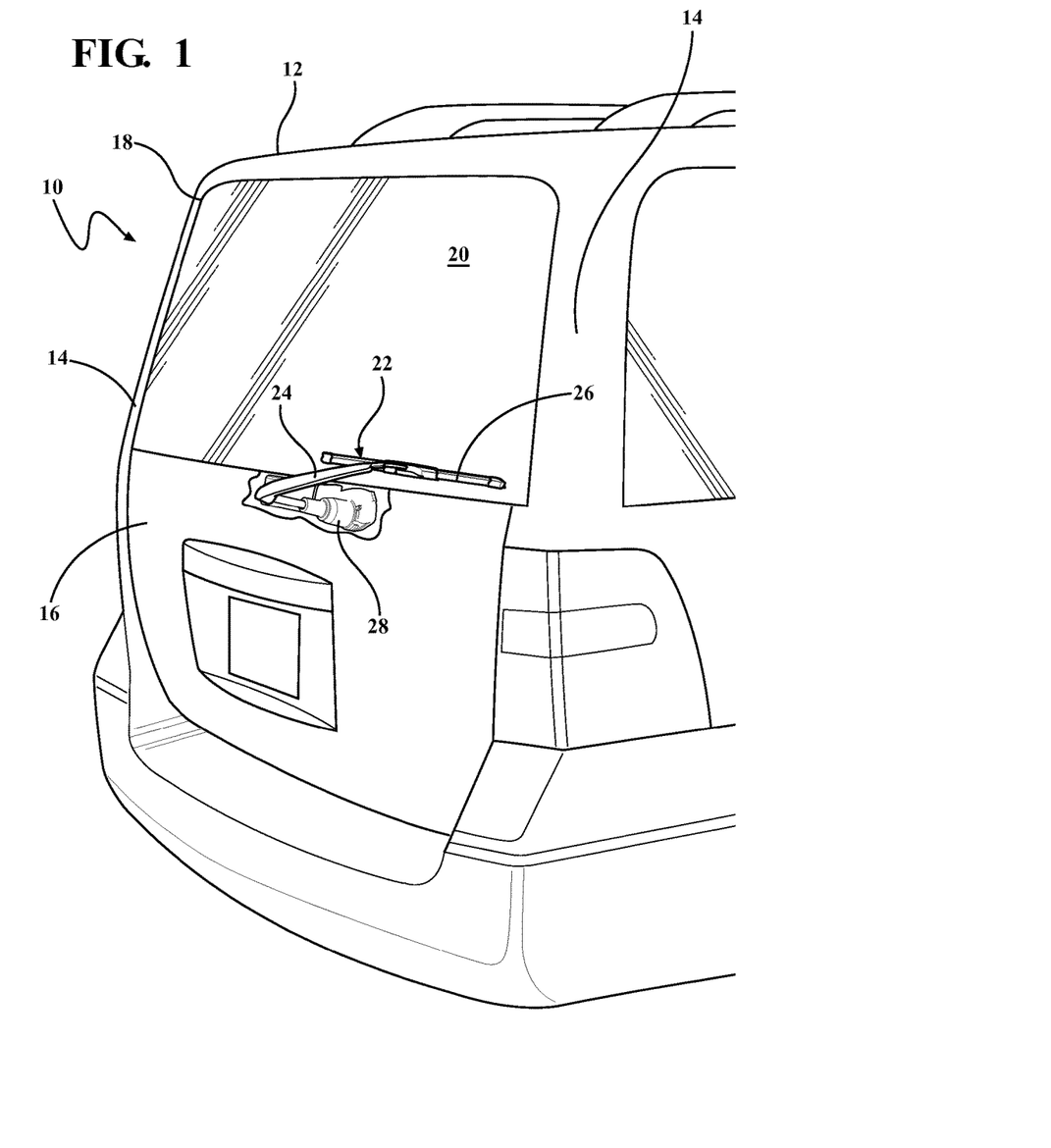
FIG. 1 is a partial perspective view of a rear of a vehicle having a wiper blade and arm pivotally mounted to a wiper motor drive system according to one embodiment of the present invention.

Referring now to the figures, where like numerals are used to designate like structure throughout the several views, a portion of the rear of a vehicle is schematically illustrated at 10 in FIG. 1. The vehicle 10 includes a roof 12, a pair of pillars 14, and a lift gate 16. The roof 12, pillars 14, and lift gate 16 cooperate to define a generally rectangular opening 18 in which a glass rear window 20 is supported. While the vehicle 10 illustrated herein has a lift gate 16 configuration, those having ordinary skill in the art will appreciate that the vehicle 10 could have any suitable rear configuration without departing from the scope of the present invention. By way of example, the vehicle 10 could have a hatchback, fastback, or trunk/boot-type rear configuration. Further, as illustrated, the vehicle 10 is an automobile, but could be any type of vehicle, such as a heavy-duty truck, train, airplane, ship, construction vehicle, military vehicle, or any other type of vehicle that contains surface wiper systems.

A wiper system is generally indicated at 22 in FIG. 1 and is employed to clean the rear window 20 of the vehicle 10. The wiper system 22 includes a wiper blade 26 operatively attached to a wiper arm 24. While the wiper system 22 illustrated in FIG. 1 depicts a single wiper arm 24 and wiper blade 26, those having ordinary skill in the art will appreciate that the wiper system 22 could employ any number of wiper arms 24 and wiper blades 26 without departing from the scope of the present invention.

In operation, the wiper arm 24 and wiper blade 26 are driven in an oscillating manner across the rear window 20 of the vehicle 10 by a wiper motor drive system 28 operatively attached to the wiper arm 24. In the representative example illustrated herein, the wiper motor drive system 28 is mounted inside the lift gate 16 of the vehicle 10. However, those having ordinary skill in the art will appreciate that the wiper motor drive system 28 could be mounted in any suitable location on the vehicle 10 without departing from the scope of the present invention. Further, while the wiper motor drive system 28 illustrated in FIG. 1 is shown in connection with the rear window 20 of the vehicle 10, those having ordinary skill in the art will appreciate that the wiper motor drive system 28 could be used in other areas of the vehicle 10 that employ a wiper system 22, such as a front windshield (not shown) or a head lamp (not shown). Thus, it will be understood that the present invention is not limited for use solely in connection with wiper motor drive systems 28 adapted for use on a vehicle's 10 rear window 20, but for use in all applications where wiper motor drive systems 28 are employed.

Figure 3:
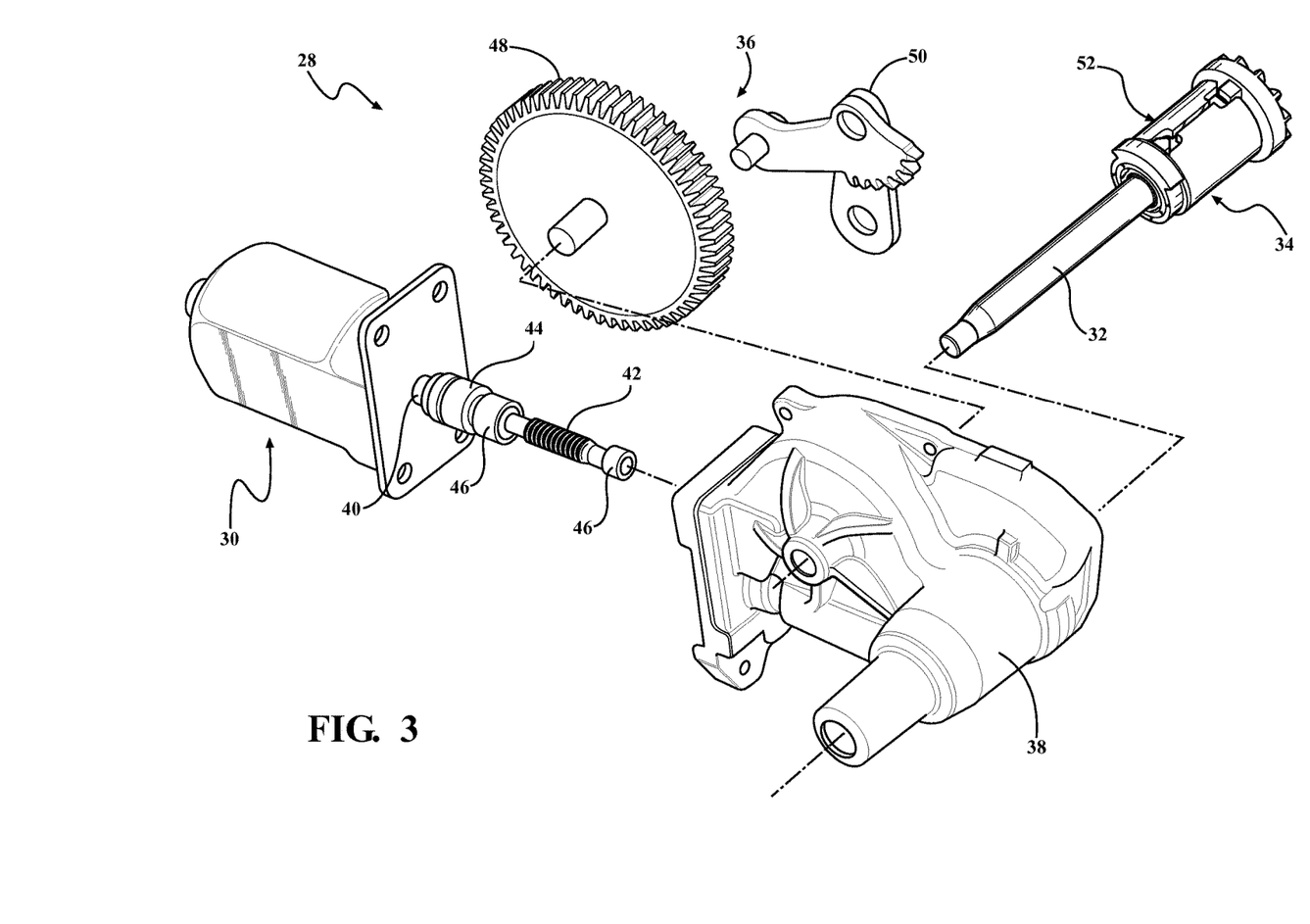
FIG. 3 is an exploded perspective view of the wiper motor drive system, according to one embodiment of the present invention, of FIG. 2.

Referring to FIG. 3, in one embodiment, the wiper motor drive system 28 of the present invention includes a motor, generally indicated at 30, an output shaft 32 operatively connected to the wiper blade 26, and a breakaway clutch, generally indicated at 34, operatively connected between the motor 30 and the output shaft 32. The wiper motor drive system 28 may further include a transmission, generally indicated at 36, and a housing 38. Each of these components will be described in greater detail below.

In operation, the motor 30 generates a rotational output that is translated to the breakaway clutch 34 which, in turn, translates the rotational output to the output shaft 32. The output shaft 32 is operatively attached to and drives the wiper arm 24 and wiper blade 26 in a reciprocal manner across the rear window 20. In the embodiment illustrated in FIG. 3, the motor 30 includes an armature 40 operatively connected to a worm 42 via a coupling 44. Further, an arrangement of bushings 46 cooperate with the housing 38 and provide support to the armature 40 and worm 42. As shown, the motor 30 is a brushed DC electric motor. However, those having ordinary skill in the art will appreciate that any motor capable of generating a rotational output could be used.

In one embodiment, the transmission 36 converts the rotational output from the motor 30 into an oscillating output, which is then translated to the output shaft 32 through the breakaway clutch 34. In the embodiment illustrated in FIG. 3, the transmission 36 includes a worm gear 48 and linking members 50 that are supported within the housing 38. The worm gear 48 engages and is rotated by the worm 42 of the motor 30. The linking members 50 are operatively connected to the worm gear 48. As the worm gear 48 rotates, the linking members 50 cooperate with the housing 38 and worm gear 48 to generate an oscillating rotational output, which is translated to the output shaft 32 via the breakaway clutch 34. The output shaft 32 then drives the wiper arm 24 and wiper blade 26 in a reciprocal manner across the rear window 20

Figure 2:
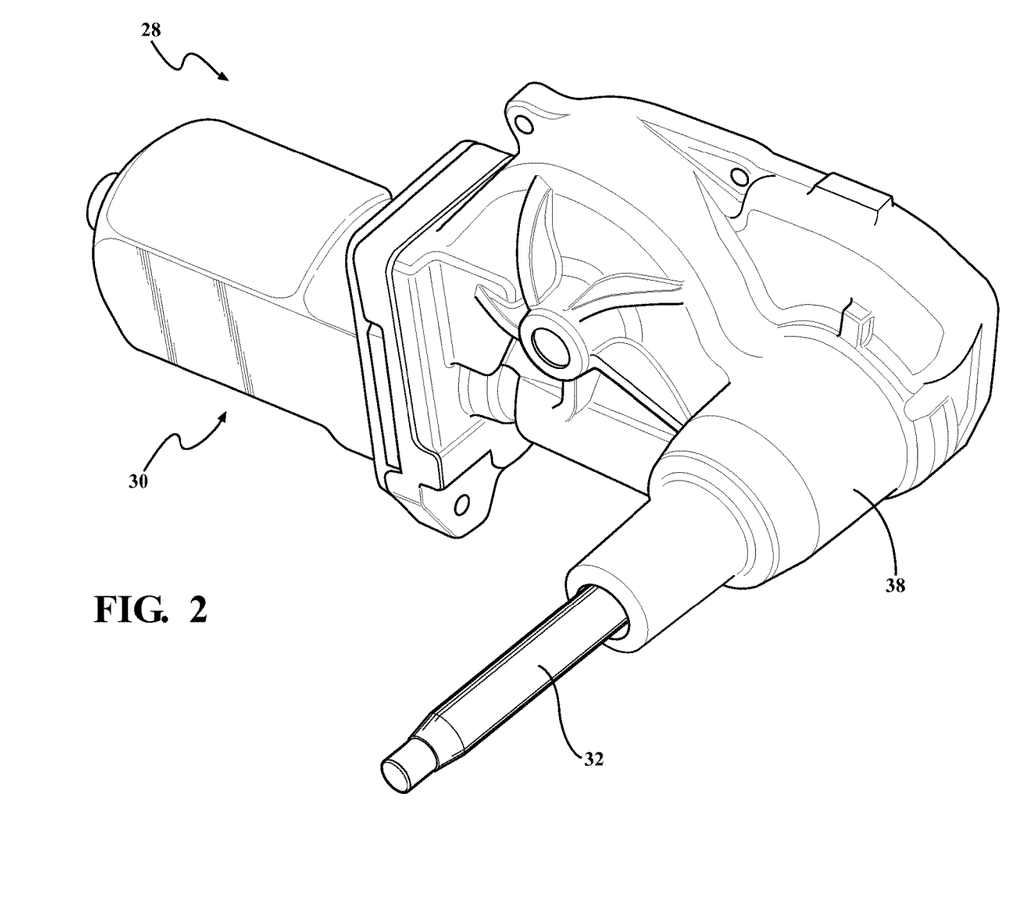
FIG. 2 is an enlarged perspective view the wiper motor drive system, according to one embodiment of the present invention, of FIG. 1.

In the embodiment illustrated in FIGS. 2 and 3, the housing 38 is configured to receive and secure the motor 30, output shaft 32, breakaway clutch 34, and transmission 36, and is accordingly sized and shaped to accommodate the same. However, those having ordinary skill in the art will appreciate that the housing 38 could be configured to be any shape suitable to receive and support the various components of the wiper motor drive system 28 without departing from the scope of the present invention.

It should be appreciated that conventional wiper systems typically include a transmission 36 and housing 38 as described above. However, those having ordinary skill in the art will appreciate that an oscillating rotational output can be generated directly from certain types of motors, such as stepper motors, BLDC motors, and the like. As such, those having ordinary skill in the art will appreciate that the wiper motor drive system 28 of the present invention could be used without a transmission 36 or a housing 38, and could utilize any suitable type of motor known in the art. Specifically, the motor 30 could generate an oscillating rotational output and translate the same directly to the breakaway clutch 34 without a transmission 36 or a housing 38.

Referring now to FIGS. 3-7, the breakaway clutch 34 includes a torque-sensitive releasable locking mechanism, generally indicated at 52. The locking mechanism 52 has a first position 52A, and a second position 52B, each of which will be described in greater detail below. When the locking mechanism 52 is in the first position 52A, torque is translated from the motor 30 to the output shaft 32 through the breakaway clutch 34 so as to drive the wiper blade 26 across the rear window 20. Thus, when the locking mechanism 52 is in the first position 52A, the breakaway clutch 34 is in a locked configuration (see FIG. 6). The locking mechanism 52 also has a second position 52B, wherein torque is interrupted between the motor 30 and the output shaft 32 in response to a predetermined rotational torque differential acting on the output shaft 32. Thus, when the locking mechanism 52 is in the second position 52B, the breakaway clutch 34 is in an unlocked configuration (see FIG. 7). Further, when the torque differential is reduced on the output shaft 32, the locking mechanism 52 is movable back to the first position 52A.

In one embodiment, the locking mechanism 52 includes a groove 54, a collar 56, and a release member 60, each of which will be described in greater detail below. The groove 54 of the locking mechanism 52 is defined in the output shaft 32. As shown best in FIGS. 5-7, the groove 54 has a concave profile. However, those having ordinary skill in the art will appreciate that the groove could have any suitable profile without departing from the scope of the present invention.

Figure 5:
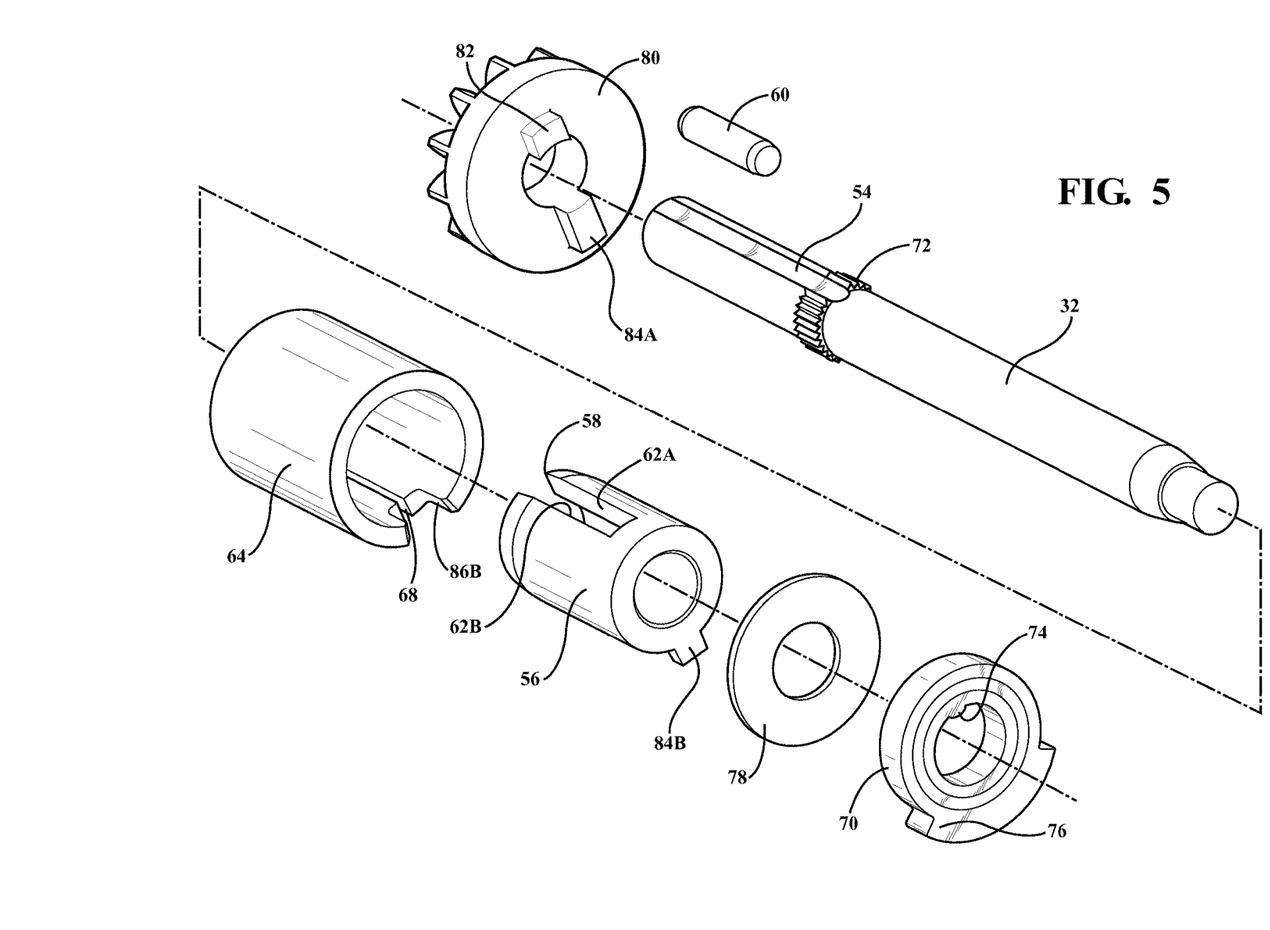
FIG. 5 is an exploded perspective view of the breakaway clutch of FIG. 4B
Figure 6:
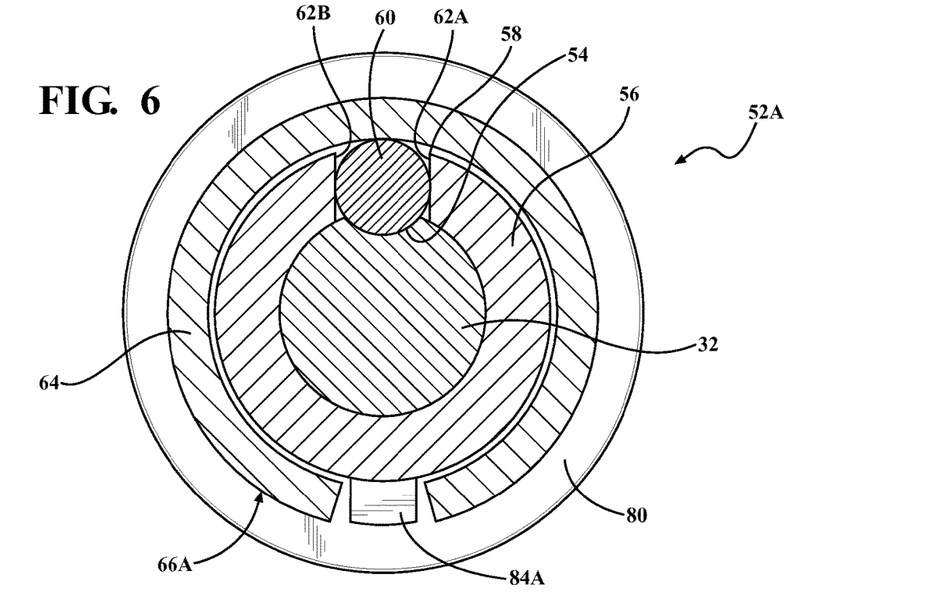
FIG. 6 is a sectional view taken along line 6-6 of FIG. 5, showing the breakaway clutch in a locked configuration.
Figure 7:
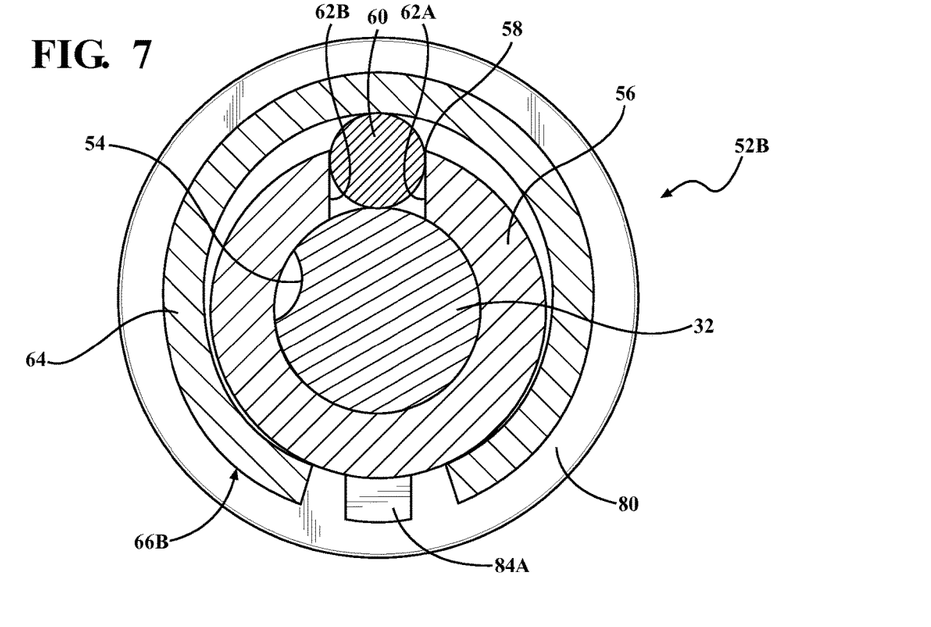
FIG. 7 is an alternate view of FIG. 6, showing the breakaway clutch in an unlocked configuration.

The collar 56 of the locking mechanism 52 is disposed about the output shaft 32. As best shown in FIG. 5, the collar 56 has a slot 58 extending longitudinally therein. When the locking mechanism 52 is in the first position 52A, the slot 58 is aligned radially with the groove 54 of the output shaft 32, wherein the collar 56 is in driven relationship with the motor 30 (or, in another embodiment, the transmission 36). Further, as best shown by FIGS. 6-7, the slot 58 defines a pair of edges 62A, 62B disposed in spaced parallel relationship with respect to each other. The edges 62A, 62B operatively engage the release member 60 and translate torque therebetween. Those having ordinary skill in the art will appreciate that the edges 62A, 62B could be configured in a non-parallel relationship and still translate torque between the release member 60.

Figure 4A:
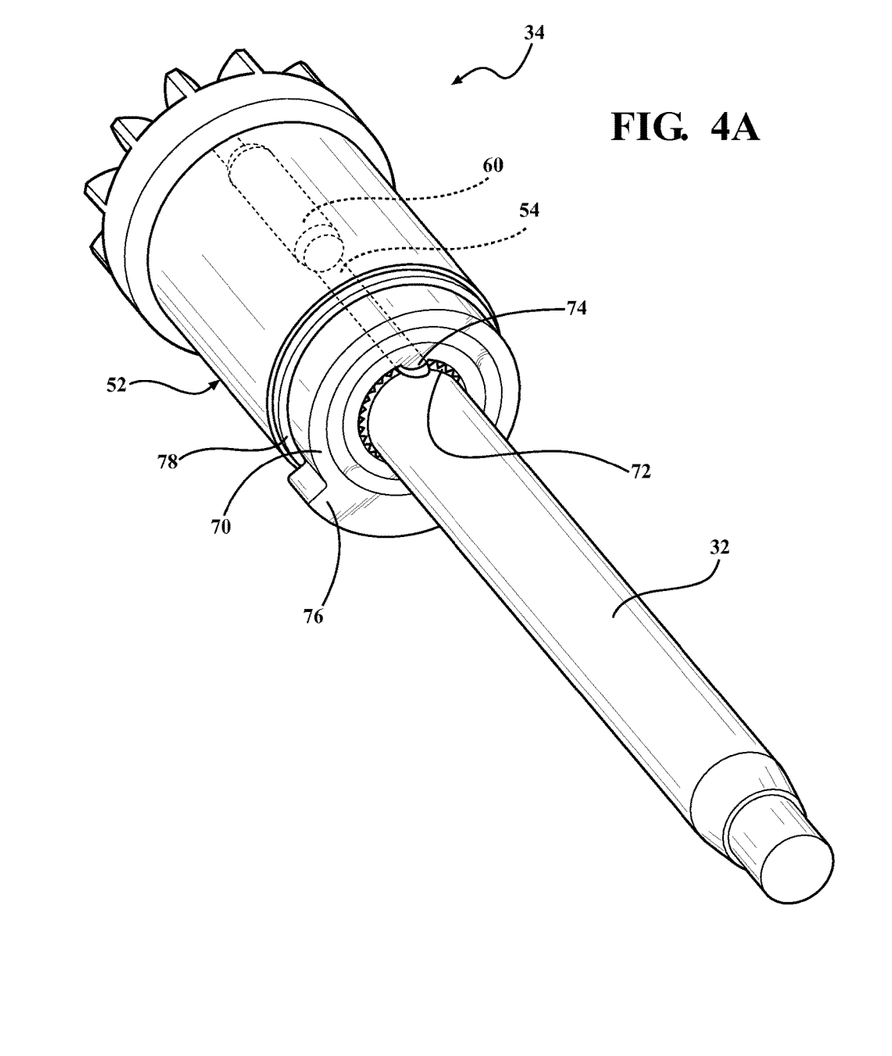
FIG. 4A is an enlarged perspective view of a breakaway clutch of the wiper motor drive system of FIG. 3.

As shown in FIGS. 5-7, the release member 60 has a substantially cylindrical body and is carried in the groove 54 of the output shaft 32 when the locking mechanism 52 is in the first position 52A. The cylindrical body of the release member 60 operatively engages each of the edges 62A, 62B defined by the slot 58 of the collar 56 to thereby translate torque between the collar 56 and the output shaft 32. As shown in FIGS. 4A, 6, and 7, when the locking mechanism 52 is in the first position 52A, the release member 60 is disposed in the groove 54 of the output shaft 32 and in the slot 58 of the collar 56. The release member 60 is movable from the first position 52A, wherein torque is translated from the collar 56 to the output shaft 32 through the release member 60 (see FIG. 6), and the second position 52B, wherein no torque is translated between the collar 56 and the output shaft 32 (see FIG. 7). Further, when in the second position 52B, the release member 60 remains at least partially disposed within the slot 58 of the collar 56. While the embodiment illustrated throughout the figures depicts a release member 60 having a cylindrical body, those having ordinary skill in the art will appreciate that the release member 60 could be any suitable shape or configuration that cooperates with the groove 54 of the output shaft 32 and the slot 58 of the collar 56, as described above, without departing from the scope of the present invention.

In one embodiment, the locking mechanism 52 further includes a retaining mechanism 64 disposed about the collar 56 and movable between a first radial position 66A, wherein the retaining mechanism 64 acts keep the release member 60 disposed in the groove 54 of the output shaft 32 (see FIG. 6), and a second radial position 66B, wherein the retaining mechanism 64 allows the release member 60 to move out of the groove 54 in response to a predetermined rotational torque differential (see FIG. 7). As shown best in FIG. 4B, the retaining mechanism 64 is a cylindrical ring having a gap 68 extending longitudinally substantially along the entire length of the retaining mechanism 64, such that the retaining mechanism 64 is movable from a first radial position 66A (see FIG. 6) to a second radial position 66B (see FIG. 7) in response to a predetermined radial forced generated by the release member 60, as the release member 60 moves to the second position 52A.

Figure 4B:
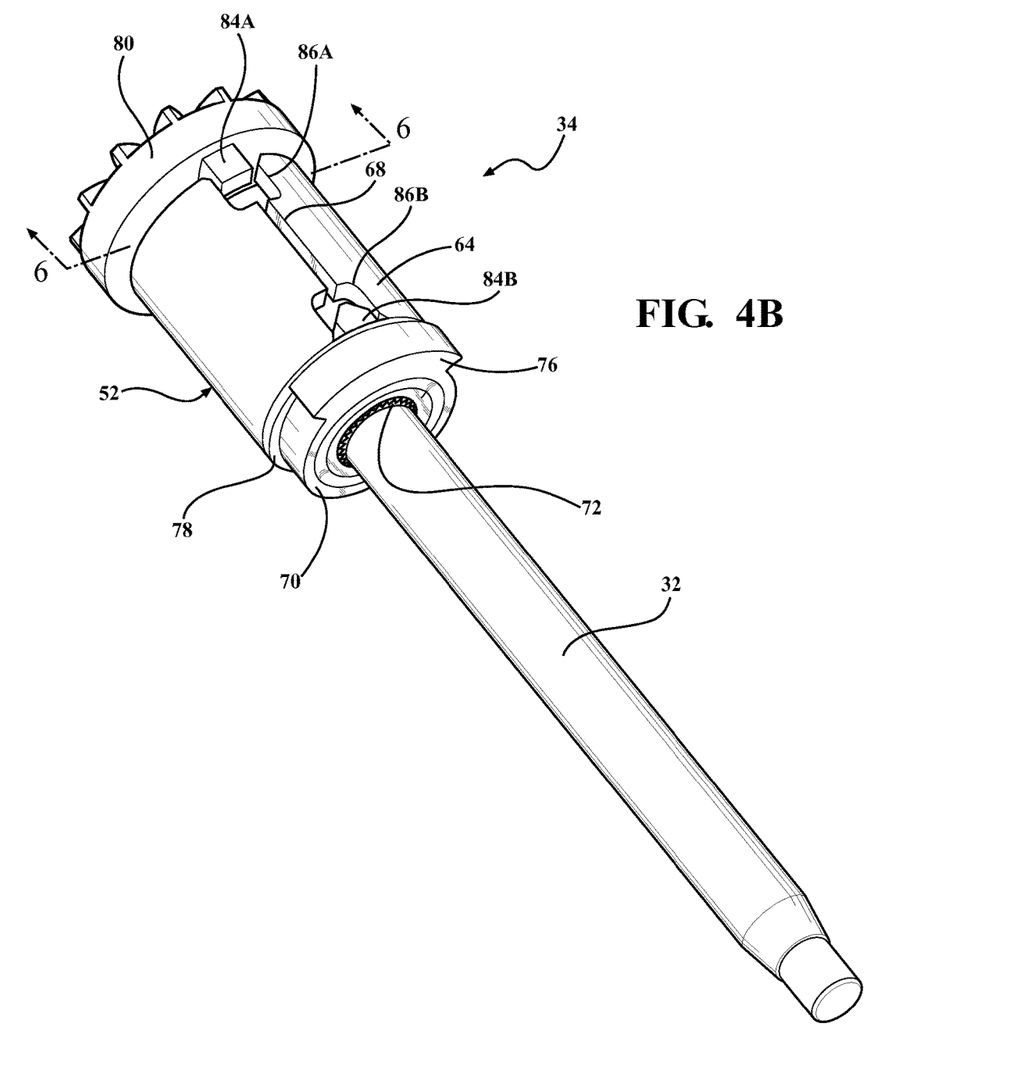
FIG. 4B is a rotated perspective view the breakaway clutch of FIG. 4A.

As shown in FIGS. 3-5, in one embodiment, the output shaft 32 further includes a stop 70. The stop 70 is operatively attached to the output shaft 32 at a knurled region 72 formed on the output shaft 32, such that the stop 70 and output shaft 32 are fixed radially and longitudinally with respect to each other. However, those having ordinary skill in the art will appreciate that the stop 70 could be operatively attached to the output shaft 32 in other ways (for example, welding, brazing, keys, splines, etc.) without departing from the scope of the present invention. The stop 70 acts as a longitudinal limit to the locking mechanism 52 along the output shaft 32. As shown best in FIG. 5, the stop 70 further includes a key 74 to radially align the stop 70 with the groove 54 of the output shaft 32. Further, the stop 70 has a rotation limiting feature 76 that cooperates with the housing 38 to prevent the output shaft 32 from rotating between predetermined angles. Thus, the knurled region 72 of the output shaft 32, the key 74 of the stop 70, the rotation limiting feature 76 of the stop 70, and the housing 38 cooperate to align the output shaft 32 with respect to the housing 38 and prevent the output shaft 32 from rotating between predetermined angles.

Referring now to FIGS. 4A-5, in one embodiment, the output shaft 32 further includes a washer 78 disposed between the stop 70 and the locking mechanism 52. The washer 78 is able to rotate freely with respect to the output shaft 32 and locking mechanism 52. Those having ordinary skill in the art will appreciate that the washer 78 provides several benefits in operation, including acting as a wear surface, a preload shim, and/or a thrust bearing.

As best shown by FIG. 5, in one embodiment, the locking mechanism 52 further includes a gear 80. The gear 80 has a coupling feature 82 that cooperates with the slot 58 of the collar 56 to operatively attach the gear 80 to the collar 56. Thus, the gear 80 is in driven relationship with the motor 30 (or, in one embodiment, the transmission 36) so as to translate torque to the collar 56. Referring to FIGS. 4B-7, the gear 80 and collar 56 each also include an alignment tab 84A,B, and the retaining mechanism 62 includes a pair of alignment slots 86A,B, wherein the alignment tabs 84A,B are disposed in the alignment slots 86A,B such that the retaining mechanism 62 is substantially prevented from rotating with respect to the collar 56.

In operation, when the locking mechanism 52 is in the first position 52A, the motor 30 translates oscillating rotational output to the output shaft 32, which drives the wiper system 22 in a reciprocating motion across the rear window 20. Thus, during normal operation of the wiper system 22, the locking mechanism 52 remains in the first position 52A. Specifically, while in the first position 52A, the retaining mechanism 64 holds the release member 60 in the groove 54 of the output shaft 32 and in the slot 58 of the collar 56, whereby oscillating rotational output is translated through the gear 80, to the collar 56, from the edges 62A, 62B of the collar 56 to the release member 60, and from the release member 60 to the output shaft 32. The locking mechanism 52 remains in the first position 52A until a predetermined torque differential occurs between the output shaft 32 and the collar 56. By way of example, such a torque differential could occur if the wiper system 22 were held in place during movement across the rear window 20. Such an external torque applied to the wiper system 22 translates to the output shaft 32. When the external torque reaches a predetermined amount, the locking mechanism 52 moves to the second position 52B. Specifically, the release member 60 moves out of the groove 54 of the output shaft 32 and simultaneously forces the retaining mechanism 64 to expand radially outwardly, wherein the release member 60 remains disposed in the slot 58 of the collar 56, positioned between the output shaft 32 and the retaining mechanism 64. Thus, in the second position 52B, no torque or oscillating rotation is translated from the motor 30 to the output shaft 32. However, when the external torque is reduced to below the predetermined amount, and when the slot 58 of the collar 56 aligns radially with the groove 54 of the output shaft 32, the retaining mechanism 64 contracts radially inwardly and simultaneously forces the release member 60 into the groove 54 of the output shaft 32. Those having ordinary skill in the art will appreciate that the amount of external torque necessary to move the locking mechanism 52 of the breakaway clutch 34 from the first position 52A to the second position 52B (the predetermined torque differential) is a function of the geometry and material properties of the various components of the locking mechanism 52.

In this way, the wiper motor drive system 28 detachably links the output shaft 32 to the motor and/or transmission 36 through a breakaway clutch 34, providing torque-sensitive overload protection to the wiper motor drive system 28. This enables the components of the wiper motor drive system 28 (for example, the worm 42, worm gear 48, linking members 50, and motor 30) to be designed with greater flexibility in terms of size and geometry, weight, material selection, and stress/force capability. Specifically, those having ordinary skill in the art will appreciate that smaller, lighter, and less expensive components can be utilized in wiper motor drive systems 28 in light of the torque-sensitive overload protection afforded by the present invention.

Further, those having ordinary skill in the art will appreciate that the breakaway clutch 34 of the present invention allows a wiper motor drive system 28 to be designed with a particularly small size and optimized geometry. Specifically, the breakaway clutch 34 of the present invention expands radially and not longitudinally (with respect to the output shaft). This radial expansion affords a low-profile longitudinal packaging height enjoyed by the various components of the wiper motor drive system 28, thus further reducing the size and weight of the wiper motor drive system 28.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A wiper motor drive system comprising:
a motor, an output shaft operatively connected to a wiper blade, and a breakaway clutch operatively connected between said motor and said output shaft;
said breakaway clutch including a torque-sensitive releasable locking mechanism having a first position wherein torque is translated from said motor to said output shaft through said breakaway clutch to drive the wiper blade across a surface to be wiped, and a second position wherein torque is interrupted between said motor and said output shaft in response to a predetermined rotational torque differential acting on said output shaft, said locking mechanism being movable back to said first position when said differential torque is reduced on said output shaft;
wherein said torque-sensitive releasable locking mechanism further includes a groove defined in said output shaft, a collar disposed about said output shaft, said collar having a slot aligned with said groove of said output shaft and being in driven relationship with said motor, and a release member disposed in said groove of said shaft and in said slot of said collar, said release member movable from said first position wherein torque is translated from said collar to said output shaft through said release member and said second position wherein no torque is translated between said collar and said output shaft.

2. The wiper motor drive system as set forth in claim 1, wherein said slot of said collar defines a pair of edges disposed in spaced parallel relationship with respect to each other, said release member has a cylindrical body which is carried in said groove in releasable fashion and operatively engages each of said edges of said slot to thereby translate torque between said collar and said output shaft.

3. The wiper motor drive system as set forth in claim 2, wherein said groove of said output shaft has a concave profile.

4. The wiper motor drive system as set forth in claim 1, wherein said torque-sensitive releasable locking mechanism further includes a retaining mechanism disposed about said collar and movable between a first radial position wherein said retaining mechanism acts to keep said release member disposed in said groove of said output shaft, and a second radial position wherein said retaining mechanism allows said release member to move out of said groove in response to a predetermined rotational torque differential.

5. The wiper motor drive system as set forth in claim 1, wherein said retaining mechanism is a cylindrical ring having a gap extending longitudinally substantially along the entire length of said retaining mechanism such that said retaining mechanism is movable from a first radial position to a second radial position in response to a predetermined radial force generated by said release member as said release member moves to said second position.

6. The wiper motor drive system as set forth in claim 4, wherein said output shaft further includes a stop operatively attached thereto and a washer disposed between said stop and said torque-sensitive releasable locking mechanism, such that said locking mechanism is constrained longitudinally with respect to said output shaft by said stop.

7. The wiper motor drive system as set forth in claim 4, wherein said torque-sensitive releasable locking mechanism further includes a gear operatively attached to said collar, with said gear being in driven relationship with said motor so as to translate torque from said motor to said collar.

8. The wiper motor drive system us set forth in claim 7, wherein at least one of said gear and said collar has an alignment tab, and said retaining mechanism has at least one alignment slot, with said alignment tab being disposed in said alignment slot such that said retaining mechanism is substantially prevented from rotating with respect to said collar.

9. A wiper motor drive system comprising:
a motor, an output shaft operatively connected to said motor, an output shaft operatively connected to a wiper blade, and a breakaway clutch operatively connected between said transmission and said output shaft;
said breakaway clutch including a torque-sensitive releasable locking mechanism having a first position wherein torque is translated from said transmission to said output shaft through said breakaway clutch to drive the wiper blade across a surface to be wiped, and a second position wherein torque is interrupted between said transmission and said output shaft in response to a predetermined rotational torque differential acting on said output shaft, said locking mechanism being movable back to said first position when said differential torque is reduced on said output shaft;
wherein said torque-sensitive releasable locking mechanism further includes a groove defined in said output shaft, a collar disposed about said output shaft said collar having a slot aligned with said groove of said output shaft and being in driven relationship with said transmission, and a release member disposed in said groove of said shaft and in said slot of said collar, said release member movable from said first position wherein torque is translated from said collar to said output shaft through said release member and said second position wherein no torque is translated between said collar and said output shaft.

10. The wiper motor drive system as set forth in claim 9, wherein said slot of said collar defines a pair of edges disposed in spaced parallel relationship with respect to each other, said release member has a cylindrical body which is carried in said groove in releasable fashion and operatively engages each of said edges of said slot to thereby translate torque between said collar and said output shaft.

11. The wiper motor drive system as set forth in claim 10, wherein said groove of said output shaft has a concave profile.

12. The wiper motor drive system as set forth in claim 9, wherein said torque-sensitive releasable locking mechanism further includes a retaining mechanism disposed about said collar and movable between a first radial position wherein said retaining mechanism acts to keep said release member disposed in said groove of said output shaft, and a second radial position wherein said retaining mechanism allows said release member to move out of said groove in response to a predetermined rotational torque differential.

13. The wiper motor drive system as set forth in claim 12, wherein said retaining mechanism is a cylindrical ring having a gap extending longitudinally substantially along the entire length of said retaining mechanism such that said retaining mechanism is movable from a first radial position to a second radial position in response to a predetermined radial force generated by said release member as said release member moves to said second position.

14. The wiper motor drive system as set forth in claim 12, wherein said output shaft further includes a stop operatively attached thereto and a washer disposed between said stop and said torque-sensitive releasable locking mechanism, such that said locking mechanism is constrained longitudinally with respect to said output shaft by said stop.

15. The wiper motor drive system as set forth in claim 12, wherein said torque-sensitive releasable locking mechanism further includes a gear operatively attached to said collar, with said gear being in driven relationship with said transmission so as to translate torque from said transmission to said collar.

16. The wiper motor drive system as set forth in claim 15, wherein at least one of said gear and said collar has an alignment tab, and said retaining mechanism has at least one alignment slot, with said alignment tab being disposed in said alignment slot such that said retaining mechanism is substantially prevented from rotating with respect to said collar.

* * * * *

UNITED STATES PATENT AND TRADEMARK OFFICE
CERTIFICATE OF CORRECTION

PATENT NO. : 9,604,602 B2  
APPLICATION NO. : 14/174124  
DATED : March 28, 2017  
INVENTOR(S) : Baasch et al.

Page 1 of 1

It is certified that error appears in the above-identified patent and that said Letters Patent is hereby corrected as shown below:

In the Claims

Column 8, Claim 5, Line 23, "claim 1" should be --claim 4--  
Column 8, Claim 9, Line 50, "a motor, an output shaft" should be --a motor, a transmission--

Signed and Sealed this  
Second Day of October, 2018

Andrei Iancu  
*Director of the United States Patent and Trademark Office*